No. 729,421. PATENTED MAY 26, 1903.
W. E. RYER.
TROLLEY WHEEL.
APPLICATION FILED NOV. 8, 1902.
NO MODEL.
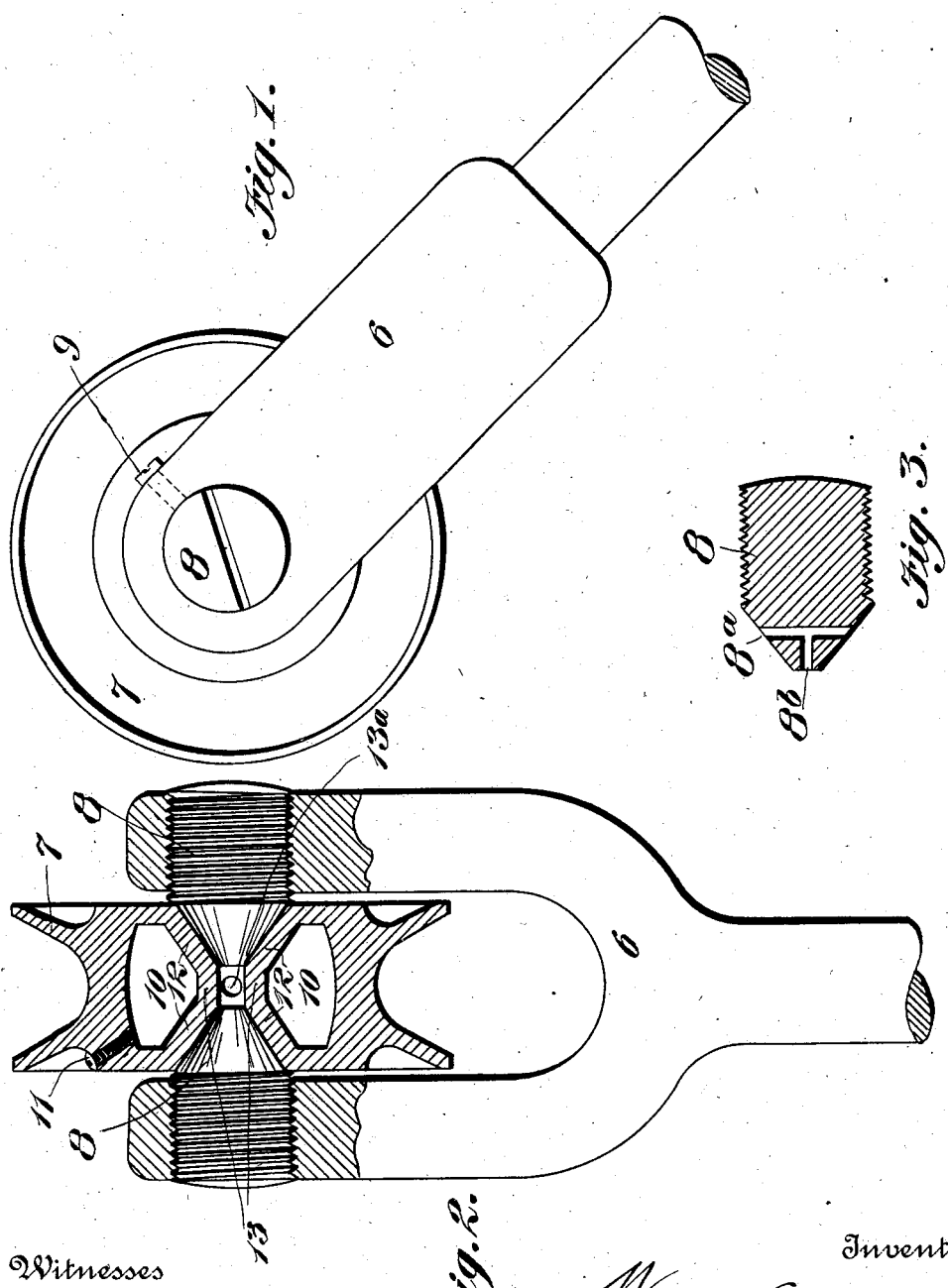

No. 729,421. Patented May 26, 1903.

UNITED STATES PATENT OFFICE.

WALTER E. RYER, OF OLEAN, NEW YORK.

TROLLEY-WHEEL.

SPECIFICATION forming part of Letters Patent No. 729,421, dated May 26, 1903.

Application filed November 8, 1902. Serial No. 130,528. (No model.)

*To all whom it may concern:*

Be it known that I, WALTER E. RYER, a citizen of the United States, residing at Olean, in the county of Cattaraugus and State of New York, have invented certain new and useful Improvements in Trolley-Wheels; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates particularly to lubricating trolley-wheels; and the object thereof is to form an improved trolley-head with respect to the bearings, the construction of the wheel, and the lubricating devices.

The life of an average trolley-wheel is comparatively short, on some roads only two or three days, entailing the purchase of several hundred trolley-wheels per week, and the necessity for and advantage of a simple and cheap wheel made with as few parts as possible is obvious.

The invention is illustrated in the accompanying drawings, in which—

Figure 1 is a side elevation. Fig. 2 is a vertical cross-section, and Fig. 3 is a section of a modified form of cone used in the bearings.

Referring specifically to the drawings, the head comprises a fork 6 and wheel 7, and the wheel runs on cones 8, which are made of hard steel and screwed into or through the arms of the fork. They are accordingly adjustable to tighten or loosen the bearings and are retained at adjustment by the set-screws 9. These cones are of good size, sufficient to give a large bearing and to stand the strain, which is considerable.

The wheel is cast in one piece, and within it an annular oil-chamber 10 is formed, filled through a hole closed by the screw-plug 11. The cone-shaped bearing-sockets for the cones are formed in each side of the wheel by extending inwardly the side walls of the wheel, as at 12, and these sockets are joined or bridged by a tube 13. This is important and a practical improvement on those wheels in which the bearing-sockets are not connected across the center of the wheel, but are divided by an annular space. My construction has the advantage that the bearing-sockets are thereby strengthened and supported and held true, which is essential in a one-piece chambered wheel made of comparatively soft metal, such as brass; otherwise the sockets would be apt to cave or spread their walls under severe strain or twist, as in going rapidly around curves, and it would be necessary to use steel or other hard bushings or an axle-bolt, as is common in similar wheels and which makes increased cost for labor and material, or to so thicken the walls of the sockets as to encroach on the oil-chamber with a consequent extra amount, weight, and cost of metal. Furthermore, if steel bushings and cones be used, which will give a steel-to-steel contact, they will blister on passage of the current. Hence a cast one-piece oil-chambered wheel without bushings or axle, so formed as to be strong enough to stand the strain and of comparatively light weight of metal, is very advantageous in manufacture and use. These qualities and advantages are embodied in my invention.

The tube 13 is perforated, as at 13$^a$, to permit the flow of oil from the chamber to the tube and thence to the cones. A point of some practical importance may be noticed relative to the location of the filling-hole at 11 and the feeding-hole 13$^a$. These holes are at right angles to each other radially with respect to the axis of the wheel, so there is an indirect or L flow which avoids leakage when the wheel is at rest.

The bearing-cones may be varied, as shown in Fig. 3, to improve the feed of oil to the bearing-face of the cones by a diametrical bore at or about the middle of the incline, as at 8$^a$, joining an axial bore 8$^b$ from the point of the cone, so that oil will be fed from the tube 13 immediately to the base portion of the cone.

It will be seen that a trolley-head constructed according to my invention has few and simple parts. The wheel is cast whole, avoiding extra cost of bushings and the labor of inserting the same. No axle is necessary, and the construction of the bearing-sockets is believed to give a maximum of strength for the amount of metal.

What I claim as new, and desire to secure by Letters Patent, is—

1. A trolley-wheel having conical bearing-sockets in each side, an integral central tube of smaller diameter than the sockets rigidly and inseparably joining the inner ends thereof, and an annular oil-chamber around the tube and sockets, the walls of the sockets forming walls for the oil-chamber inclined inwardly toward the tube.

2. The combination with a fork, and a wheel having cone bearing-sockets in each side and an annular oil-chamber communicating axially therewith, of cones supported on the fork, having oil-bores leading from their points to their sides, substantially as described.

In testimony whereof I affix my signature in presence of two witnesses.

WALTER E. RYER.

Witnesses:
W. D. PARKER,
ETHEL E. JOHNSON.